United States Patent
Matysek et al.

(10) Patent No.: US 11,823,151 B2
(45) Date of Patent: Nov. 21, 2023

(54) KIOSKS WITH PARALLEL JOB PROCESSING

(71) Applicant: Xerox Corporation, Norwalk, CT (US)

(72) Inventors: Kathryn K. Matysek, Fairport, NY (US); Prince Gerald Albert, Webster, NY (US); Srinivasan Kottaiyappan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/475,796

(22) Filed: Sep. 15, 2021

(65) Prior Publication Data
US 2023/0082622 A1 Mar. 16, 2023

(51) Int. Cl.
*G06Q 20/18* (2012.01)

(52) U.S. Cl.
CPC .................................. *G06Q 20/18* (2013.01)

(58) Field of Classification Search
CPC ...................................................... G06Q 20/18
See application file for complete search history.

(56) References Cited

U.S. PATENT DOCUMENTS

| | | | | | |
|---|---|---|---|---|---|
| 5,555,099 | A * | 9/1996 | Telle | ............... | H04N 1/32358 358/401 |
| 7,839,521 | B2 * | 11/2010 | Bard | ............... | G06F 3/1222 705/16 |
| 9,501,769 | B2 * | 11/2016 | Guérin | ............... | G06Q 20/202 |
| 10,728,400 | B2 * | 7/2020 | Curry | ............... | H04N 1/00169 |
| 2001/0024294 | A1 * | 9/2001 | Tanaka | ............... | G06Q 30/06 358/1.15 |
| 2004/0186894 | A1 * | 9/2004 | Jhingan | ............... | H04L 63/083 709/207 |
| 2005/0162667 | A1 * | 7/2005 | Felix | ............... | H04N 1/00236 358/1.13 |
| 2006/0178948 | A1 * | 8/2006 | Yamada | ............... | G06Q 20/18 705/26.8 |
| 2007/0035763 | A1 * | 2/2007 | Bard | ............... | G06F 3/1267 358/1.15 |
| 2007/0069015 | A1 * | 3/2007 | Vernon | ............... | G06Q 20/18 235/383 |
| 2007/0086042 | A1 * | 4/2007 | Herold | ............... | G06F 3/1263 358/1.15 |
| 2007/0201048 | A1 * | 8/2007 | DuBois | ............... | G06F 3/1204 358/1.18 |
| 2008/0189598 | A1 * | 8/2008 | Yoshida | ............... | G03G 21/02 715/227 |

(Continued)

OTHER PUBLICATIONS

EFI Self-Serve Copy and Print brochure. Retrieved from <https://ryanbusiness.com/wp-content/uploads/2019/10/SelfServe_Campus_Brochure.pdf>. 2018. (Year: 2018).*

*Primary Examiner* — Nathan A Mitchell (57) ABSTRACT

A kiosk is disclosed. For example, the kiosk includes a graphical user interface (GUI), a payment processing module to receive payment, a processor, and a non-transitory computer-readable medium storing a plurality of instructions, which when executed by the processor, causes the processor to perform operations. The operations include receiving a plurality of job requests, providing a total cost of the plurality of job requests on the GUI, receiving confirmation of the total costs via the GUI, receiving a single payment for the plurality of job requests via the payment processing module, and executing the plurality of job requests.

17 Claims, 6 Drawing Sheets

(56) References Cited

U.S. PATENT DOCUMENTS

| | | | |
|---|---|---|---|
| 2009/0299832 A1* | 12/2009 | Manchala | H04L 9/3247 |
| | | | 705/14.1 |
| 2010/0073287 A1* | 3/2010 | Park | G06F 3/017 |
| | | | 345/157 |
| 2010/0202017 A1* | 8/2010 | Sano | G03G 21/02 |
| | | | 358/1.15 |
| 2010/0253968 A1* | 10/2010 | Nuggehalli | G06F 3/1285 |
| | | | 358/1.15 |
| 2011/0228324 A1* | 9/2011 | Toyazaki | G06F 3/1247 |
| | | | 358/1.15 |
| 2011/0267647 A1* | 11/2011 | Kamasuka | G06F 3/1288 |
| | | | 358/1.15 |
| 2015/0127607 A1* | 5/2015 | Savage | G06F 16/245 |
| | | | 707/693 |
| 2015/0371126 A1* | 12/2015 | Ota | G06K 15/408 |
| | | | 358/1.14 |
| 2016/0189117 A1* | 6/2016 | Sandraz | G06Q 20/027 |
| | | | 705/16 |
| 2016/0246556 A1* | 8/2016 | Rajalingam | G06F 3/1226 |
| 2018/0165655 A1* | 6/2018 | Marcelle | G07F 9/001 |
| 2021/0004186 A1* | 1/2021 | Kanno | G06F 3/1205 |
| 2021/0037147 A1* | 2/2021 | Morba | G06Q 20/18 |
| 2021/0306473 A1* | 9/2021 | Inouye | H04N 1/00143 |
| 2022/0021786 A1* | 1/2022 | Tickler | G07F 17/266 |

* cited by examiner

FIG. 1

| JOBS — 202 | PARAMETERS — 204 | COST — 206 |
| --- | --- | --- |
| 1. JOB 1 | 50 COPIES, BW, 8.5 x 11 | $5.00 |
| 2. JOB 2 | 100 COPIES, BW, 8.5 x 11 | $10.00 |
| 3. JOB 3 | 25 COPIES, COLOR, 11 x 14 | $12.50 |
| | TOTAL: $27.50 — 208 | |

210 — CONFIRM

KIOSKS WITH PARALLEL JOB PROCESSING

The present disclosure relates generally to kiosks in public locations that require pay-per-use, and relates more particularly to a method and apparatus to allow multiple jobs to be executed with a single transaction on the kiosks that require pay-per-use.

BACKGROUND

Kiosks are deployed in various public locations. Kiosks can be deployed in business centers, airport terminals, copy/document management centers, drug stores, and the like. Kiosks allow users to execute various jobs such as obtaining high quality/high volume prints, scanning, faxing, and the like, when the user may not be able to afford a multi-function device at home.

These kiosks typically require a pay-per-use transaction where each job is performed serially. For example, the user may scan a first document to be printed and pay for the job. The user may then scan a second document to be printed and pay for the second job, and so forth. Serially executing jobs can be inefficient and may make it more difficult for the user to manage multiple jobs within a budget.

SUMMARY

According to aspects illustrated herein, there are provided a kiosk and a method for executing jobs in parallel on the kiosk. One disclosed feature of the embodiments is a kiosk that comprises a graphical user interface (GUI), a payment processing module to receive payment, a processor, and a non-transitory computer-readable medium storing a plurality of instructions, which when executed by the processor, causes the processor to perform operations. The operations include receiving a plurality of job requests, providing a total cost of the plurality of job requests on the GUI, receiving confirmation of the total costs via the GUI, receiving a single payment for the plurality of job requests via the payment processing module, and executing the plurality of job requests.

Another disclosed feature is a method for executing jobs in parallel on a kiosk. The method executed by a processor of the kiosk comprises receiving a plurality of job requests, providing a total cost of the plurality of job requests on a GUI of the kiosk, receiving a confirmation of the total costs via the GUI, receiving a single payment for the plurality of job requests via the payment processing module, and executing the plurality of job requests.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a kiosk and a method for the executing jobs in parallel on a kiosk. As discussed above, kiosks are deployed in various public locations. Kiosks can be deployed in business centers, airport terminals, copy/document management centers, drug stores, and the like. Kiosks allow users to execute various jobs such as obtaining high quality/high volume prints, scanning, faxing, and the like, when the user is travelling or may not be able to afford a multi-function device at home.

These kiosks typically require a pay-per-use transaction where each job is performed serially. For example, a payment may be authorized for a particular amount. The user may then scan a first document to be printed and pay for the job, which can be deducted from the authorized amount. The user may then scan a second document to be printed and pay for the second job, which can be deducted from the remaining authorized amount, and so forth. Serially executing jobs can be inefficient and may make it more difficult for the user to manage multiple jobs within a budget.

The present disclosure provides a kiosk with a shopping cart GUI that may allow a user to execute job requests in parallel. In other words, after a job request is confirmed, the job may be executed as a second job request is initiated. The shopping cart GUI may track the total costs of the multiple job requests and receive a single payment when all of the job requests are confirmed.

In other embodiments, the shopping cart GUI may allow a user to submit a plurality of job requests. The shopping cart GUI may show a cost associated with each job request. The user may add or delete job requests to stay within a budget, and the shopping cart GUI may update a total cost as the job requests are added or deleted.

In other embodiments, the shopping cart GUI may present selected parameters that affect the costs of each job request. For example, a user may submit a color print of a scanned document. However, the user may then change to black and white to reduce the cost of the job. The GUI may then modify the job request, or notify the user to re-scan the document in response to changes to the job request, if necessary.

Thus, the kiosk of the present disclosure may allow multiple jobs to be executed and/or managed in parallel with a single transaction or a single payment. As a result, public pay-per-use kiosks can execute jobs more efficiently. In other words, users may easily manage multiple jobs rather than having to submit and pay for each job request separately in a linear fashion.

Figure 1:
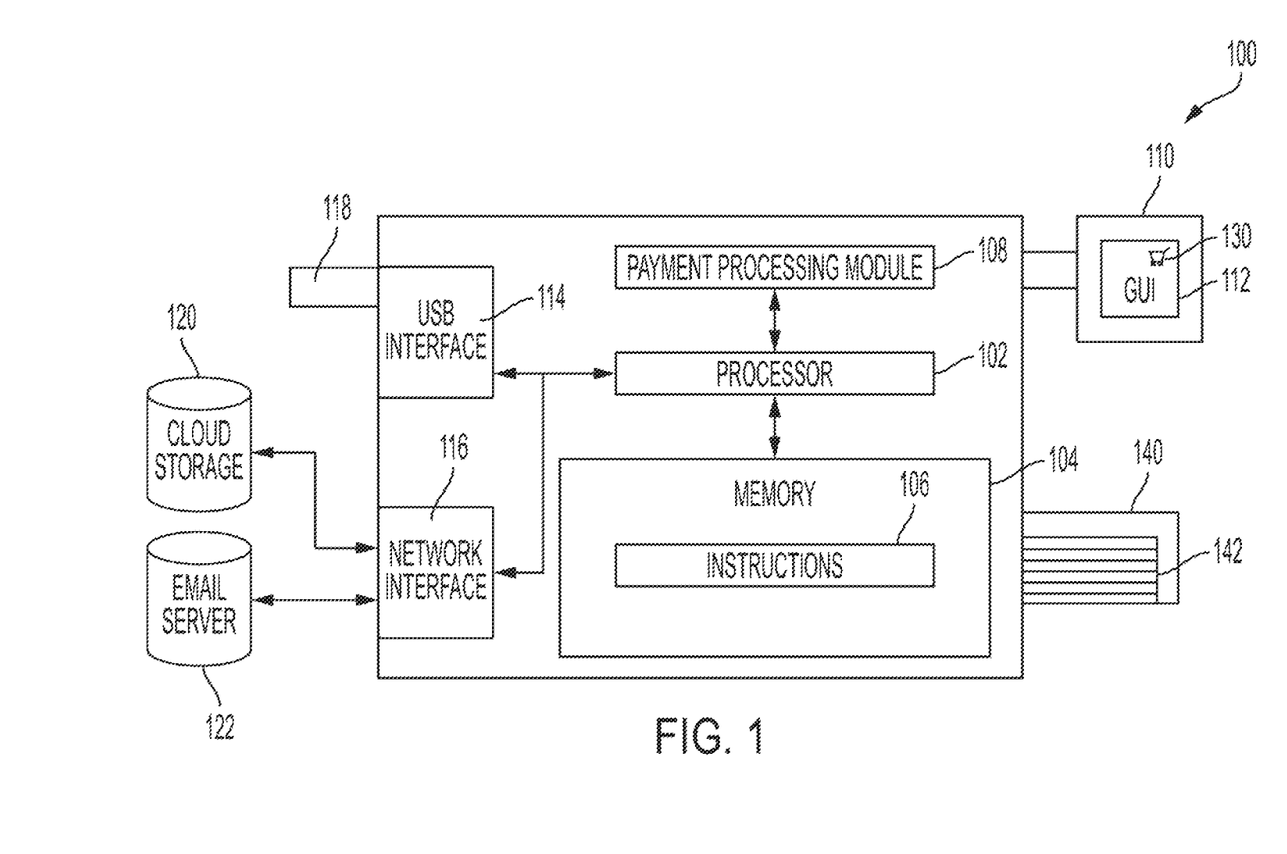
FIG. 1 illustrates a block diagram of an example kiosk of the present disclosure.

FIG. 1 illustrates an example kiosk 100 of the present disclosure. In one embodiment, the kiosk 100 may be a multi-function device (MFD) that is located in a public area that requires pay-per-use. In other words, the present disclosure provides a modification to a specific type of MFD or printer that requires payment to execute jobs. Jobs may include print jobs, scanning a document, faxing a document, copying a document, emailing a document, and the like.

The modifications to the kiosk 100 of the present disclosure allow users to more efficiently execute multiple jobs in parallel with a single payment and provide a novel graphical user interface (GUI) that allows users to easily manage the multiple jobs and costs.

In one embodiment, the kiosk 100 may include a processor 102, a memory 104, a payment processing module 108, interfaces 114 and 116, and a display 110. The processor 102 may be communicatively coupled to the memory 104, the payment processing module 108, the interfaces 114 and 116, and the display 110. The processor 102 may control operation of the payment processing module 108, the interfaces 114 and 116, and the display 110.

In one embodiment, the memory 104 may be any type of non-transitory computer readable medium. For example, the memory 104 may be a hard disk drive, a solid state drive, a random access memory (RAM), a read-only memory (ROM), and the like.

In one embodiment, the memory 104 may store instructions 106 that are executed by the processor 102 to perform the functions described herein. For example, the instructions 106, when executed by the processor 102, may cause the processor 102 to perform operations that include receiving a plurality of job requests, providing a total cost of the plurality of job requests on a graphical user interface (GUI) 112 shown on the display 110, receiving confirmation of the total costs via the GUI 112, receiving a single payment for the plurality of job requests via the payment processing module 108, and executing the plurality of job requests. Further details of the operation are discussed below.

In one embodiment, the payment processing module 108 may be a device to receive payment via a credit card or a debit card. For example, the payment processing module 108 may be a magnetic card reader for swiping a credit card or a chip reader to read a chip embedded in a credit card. In another embodiment, the payment processing module 108 may process an authorization code. For example, a user may pre-pay at a register or point of sale and receive an authorization code to enter into the kiosk 100. The authorization code may be entered via the GUI 112 and provided to the payment processing module 108 for processing the authorization code for the amount that was pre-paid. In one embodiment, the processor 102 may hold a job request until an authorization signal is generated and provided by the payment processing module 108 in response to receiving a payment.

In one embodiment, the interfaces 114 and 116 may include a universal serial bus (USB) interface 114 and a network interface 116. The USB interface 114 may allow a user to connect an external memory device 118. The user may then access documents in the external memory device 118 for the job request or scan documents to the external memory device 118.

In one embodiment, the network interface 116 may be a wired or wireless network interface. For example, the network interface 116 may be a Wi-Fi radio or an Ethernet card. The network interface 116 may allow the kiosk 100 to connect to other remotely located storage devices over the Internet or an Internet protocol (IP) network. For example, the kiosk 100 may connect to a cloud storage 120 or an email server 122 via the network interface 116. A user may log into a cloud storage account or an email account to access documents from the kiosk 100 for job requests (e.g., printing or scanning a hardcopy document to be stored in the cloud, or sending the scanned document via an outgoing email).

In one embodiment, the display 110 may be a touch screen display or a regular display with a physical input interface (e.g., a keypad, a keyboard, a trackpad, a mouse, or any combination thereof). In one embodiment, the display 110 may display the GUI 112. The GUI 112 may provide various options for a user to input a job request or menus to browse documents or file locations on the external memory device 118, the cloud storage 120, or the email server 122, as described above.

The GUI 112 may also provide a series of menus and options to select a job, a scan job, emailing a document, a copy job, and the like. The GUI 112 may allow the user to select parameters such as a number of copies, color or black and white, double sided or single sided, hole punching, paper size, and the like.

In one embodiment, the GUI 112 may include a shopping cart icon 130. The shopping cart icon 130 may allow a user to add job requests into a shopping cart. When multiple job requests are submitted, the user may select the shopping cart icon to view, manage, and/or confirm the plurality of job requests. The user may then begin execution of the job requests with a single payment. The user may continue to add job requests to the shopping cart even after a job request has started. The total costs can be updated as jobs are added.

Figure 2:
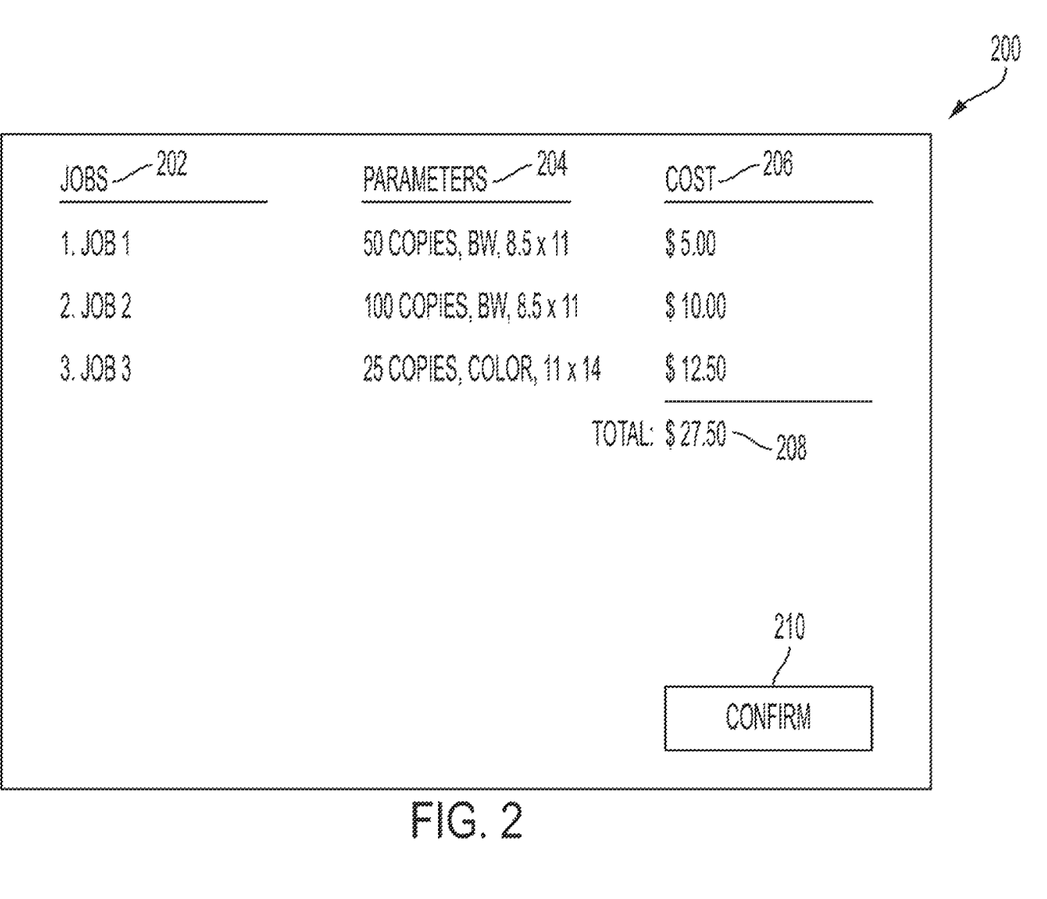
FIG. 2 illustrates an example screenshot of a graphical user interface (GUI) of the present disclosure.
Figure 3:
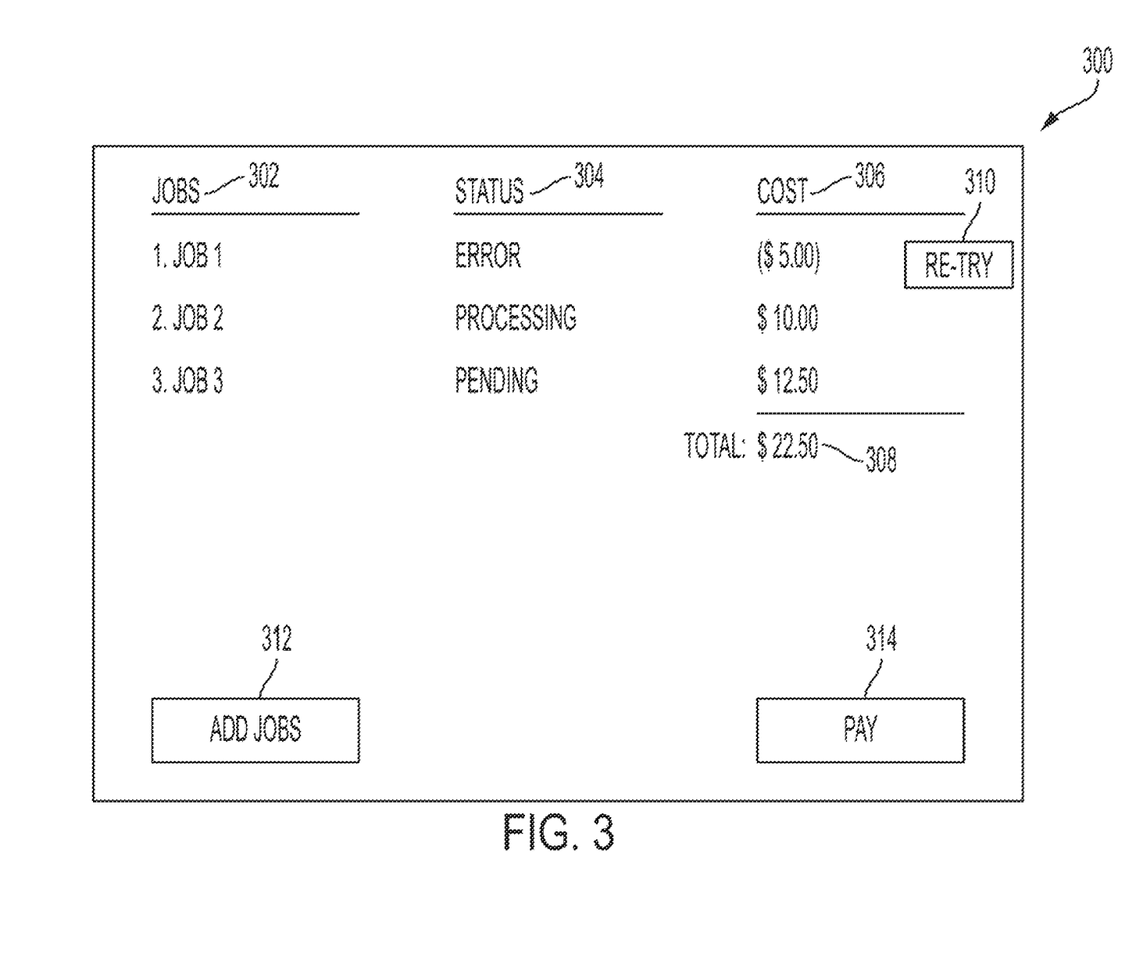
FIG. 3 illustrates another example screenshot of the GUI of the present disclosure.
Figure 4:
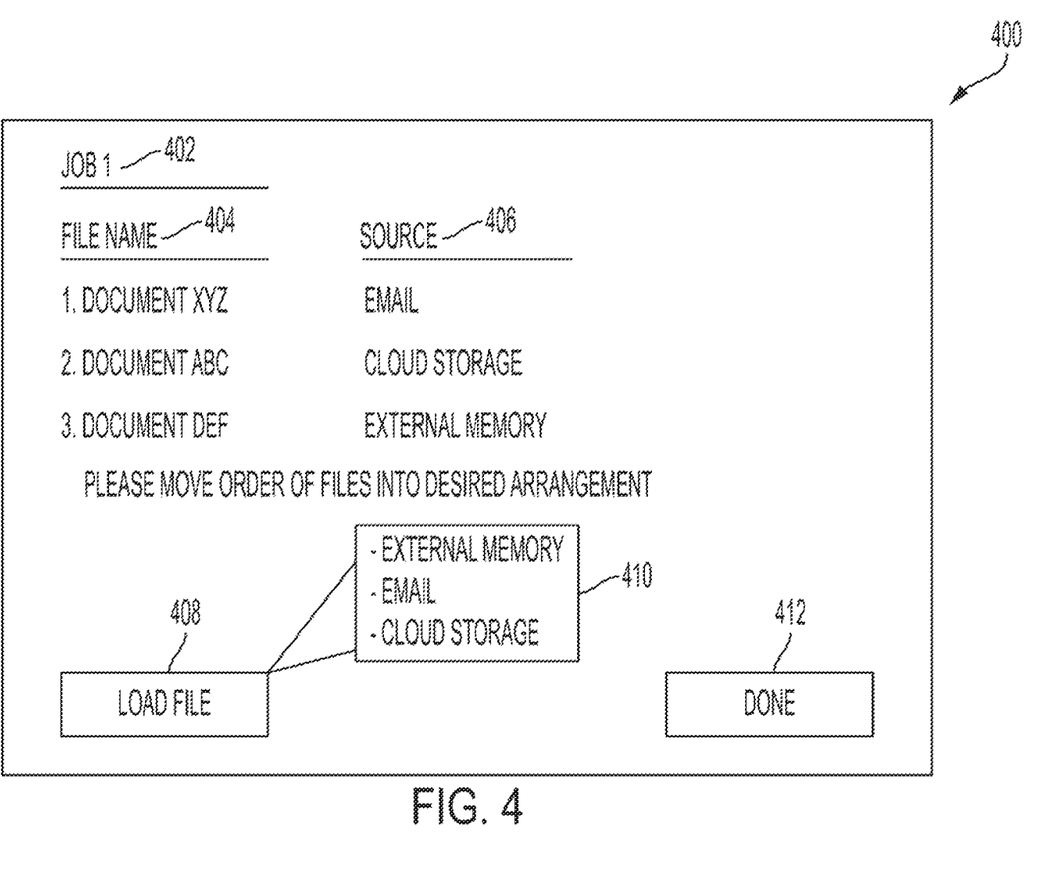
FIG. 4 illustrates another example screenshot of the GUI of the present disclosure.

In one embodiment, the single payment may be received after the user has confirmed that the user has no more job requests. For example, the kiosk 100 may include a secured compartment 140 to hold completed jobs 142 until the payment is received. FIGS. 2-4 illustrate example screenshots of the shopping cart GUI that may be presented to the user to submit a plurality of job requests, manage the plurality of job requests based on the cost of each job request, and confirm the plurality of job requests.

FIG. 2 illustrates an example screenshot 200 of the shopping cart GUI 112 presented on the display 110. In one embodiment, the GUI 112 may include jobs 202, parameters 204 associated with the jobs 202, costs 206 for each individual job 202, a total cost 208 for all of the jobs 202 collectively, and a confirm button 210. The jobs 202 may list each job requested by a user. The jobs 202 may include any function that can be performed by the kiosk 100 (e.g. a copy, a scan, printing out a document saved as a file from a memory, emailing a scanned document, and the like).

The parameters 204 may display what parameters were selected for each job 202. The parameters may include a number of copies or prints, whether the job is in black and white or in color, a paper size, and the like. Although a few example parameters 204 are shown in FIG. 2, it should be noted that other parameters 204 that are not shown may also be provided.

The costs 206 may show how much each individual job 202 will cost. The total costs 208 may show how much all of the jobs 202 will cost collectively. As a result, a user may easily see which jobs 202 contribute more to the total cost 208 and may manage which jobs to modify or delete to stay within a budget. As noted above, previously a user on a pay-per-use kiosk would have to submit jobs and pay for each job one at a time in a serial fashion. Thus, the user may begin his or her third job and realize they do not have enough remaining budget to complete the third job. In the present disclosure, the GUI 112 allows a user to easily manage all of the jobs 202 and to see each cost 206 and the total cost 208.

In one embodiment, the processor 102 may hold each job request until the confirm button 210 is selected. Thus, each job request may be queued and ready to be executed by the processor 102, but held until a confirmation signal is received.

In one embodiment, after the confirmation button 210 is selected, the jobs 202 may begin to be executed. The user may be provided with additional menus options to add more jobs in parallel while the previously submitted jobs 202 are being executed, as shown in FIG. 3 and discussed in further details below.

In one embodiment, a user may select one of the jobs 202 to change the parameters 204, which may in turn change the associated cost 206. For example, the user may change the number of copies for "Job 2" from 100 copies to 50 copies to reduce costs. The processor 102 may change the number of copies and update the costs 206 (e.g., from $10.00 to $5.00 if each copy were 10 cents). The total may be updated to $27.50. Notably, the user may not be required to rescan or resubmit the document for processing for changes to certain parameters (e.g., a number of copies or paper size). Thus, the GUI 112 may allow the user to easily manage multiple jobs 202 and make changes to jobs 202 and see the updated costs 206 and updated totals 208 before the jobs are executed and payment is submitted.

In one embodiment, the user may change "Job 3" from color to black and white to reduce costs. If the change requires the user to resubmit the document for processing, a prompt may be shown on the shopping cart GUI presented on the display 110 to rescan the document or re-upload the document from an external source.

FIG. 3 illustrates an example screenshot 300 of the shopping cart GUI 112 presented on the display 110. The screenshot 300 may include jobs 302, a status 304 of each job 302, and an add jobs button 312. In one embodiment, once the payment is submitted and the jobs 302 begin executing, the shopping cart GUI may display the status 304 of each job 302. For example, the status 304 may include completed, error, processing, pending, and the like.

In one embodiment, an error may occur for a job. For example, in the screenshot 300, the "Job 1" may experience an error (e.g., the toner may have run out and need to be replaced, a paper jam may have occurred, the file may have been corrupt and unreadable for processing by the kiosk 100, and so forth). As a result, the job may not be completed. The status 304 may show "error" for the "Job 1". The shopping cart GUI may display a re-try button 310 for the jobs 302 that incur an error.

The shopping cart GUI may automatically deduct the cost of the "Job 1" and update the total 308. If the user selects the re-try button 310, the cost 306 may be updated and re-added to the total 308 unless the error occurs again.

As noted above, the kiosk 100 of the present disclosure may provide parallel processing of jobs via the shopping cart GUI. As the jobs 302 are processing, the user may select the add jobs button 312. The user may add additional jobs while the jobs 302 are being executed or processed. As additional jobs are added, the newly added jobs may be shown in the jobs 302 and the associated cost 306 may be added. The total 308 may be updated.

When all of the user's jobs are added, the user may select the pay button 314 to pay. The user may then provide payment to the payment processing module 108 (e.g., a credit card swipe or entering an authorization number associated with a prepayment). The kiosk 100 may then release the completed jobs from the secured compartment 140.

FIG. 4 illustrates a screenshot 400 of the shopping cart GUI shown on the display 110. The screenshot 400 illustrates an example when one of the jobs may include documents from multiple different sources. The shopping cart GUI may allow a user to manage the different documents, provide a desired arrangement of the documents, and then execute and pay for the job request in the desired arrangement. For example, previously a user on a pay-per-use kiosk would have to pay to print each document from each source separately and arrange the printed documents manually. However, providing the shopping cart GUI to allow a user to provide the desired arrangement may provide a more efficient experience for generating printouts or booklets with a desired arrangement of different documents, such as print files or hardcopy documents, from different sources.

In one embodiment, the user may be taken to the screenshot 400 after selecting "Job 1" from screenshot 200. The screenshot 400 may show the name 402 of the selected job, a file name 404 of each document included in the job, a source 406 from where each document was retrieved, a page range, a load file button 408, and a done button 412. For example, "Job 1" may include three documents from email, cloud storage, and an external memory. The documents may be obtained via the external memory device 118 connected to the USB interface 114, from the cloud storage 110 via the network interface 116, from the email server 122 via the network interface 116, or from a scan of a hardcopy document. For example, a user may use the GUI 112 to log into an email account via a web browser shown on the GUI 112 or to log into a cloud storage account.

In one embodiment, the user may select the load file button 408 to add additional documents to the job. A pop-up menu 410 may be presented in response to selecting the load file button 408. The pop-up menu 410 may present options for external sources where documents may be obtained (e.g., an external memory device, an email, or a cloud storage) or a hardcopy document to be scanned. When one of the options is selected, the GUI 112 may present the user with a file directory or a web browser to access the desired documents or allow the user to scan a document.

In one embodiment, the user may provide the desired arrangement by selecting one of the files under file name 404 and sliding the selected files into a desired order. For example, "Document DEF" may be selected and moved to be above "Document ABC" for the desired arrangement.

In one embodiment, tabs of each of the pages in the documents may be shown in the screenshot 400. The user may then arrange each page of each document within a desired arrangement or order to be printed. In other words, pages from different documents obtained from different sources may be arranged in any desired order. Thus, a user may set the desired arrangement, confirm the arrangement, and then pay to execute the job in the desired arrangement with a single payment rather than having to pay for and print each job separately and manually arrange the printed pages. When, the user is finished, the user may select the done button 412 to exit the screenshot 400.

It should be noted that FIGS. 2-4 provide only a few example screenshots 200, 300, and 400 for the shopping cart GUI shown on the display 110. It should be noted that other information, buttons, and menu options may be presented. For example, the shopping cart GUI may include a screen to enter payment information, the GUI may include buttons to minimize or maximize the window, the GUI may include options to bring up job parameter selection windows to select different sized paper, different print options, zooming the image, paper orientation, scan resolution, and the like.

Figure 5:
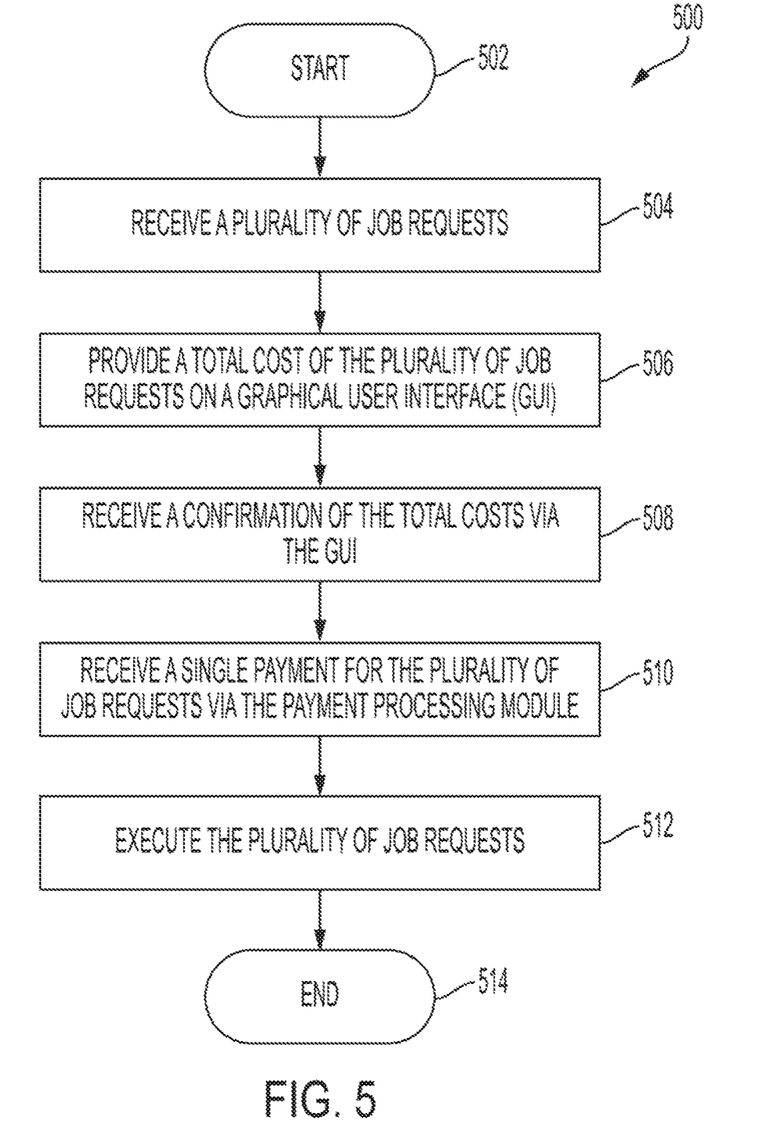
FIG. 5 illustrates a flow chart for a method for executing jobs in parallel on a kiosk of the present disclosure.

FIG. 5 illustrates a flow chart of an example method 500 for executing jobs in parallel on a kiosk of the present disclosure. In one embodiment, the method 500 may be performed by the kiosk 100 or by an apparatus such as the apparatus 600 illustrated in FIG. 6 and discussed below.

In one embodiment, the method 500 begins at block 502. At block 504, the method 500 receives a plurality of job requests.

At block 506, the method 500 provides a total cost of the plurality of job requests on a graphical user interface (GUI) of the kiosk. The job requests may be any type of job that can be performed by the kiosk. For example, the job request may be to copy a document, print a document file, scan a document, email a document, and the like. The user may submit the job requests, and the kiosk may process the job requests (e.g., generate a PDL file for the job, if necessary, generate a raster image (e.g., a bitmap), and the like), but hold execution of the job until confirmation is received for all the job requests, as discussed below.

At block 508, the method 500 receives a confirmation of the total costs via the GUI. For example, the GUI may allow a user to manage multiple jobs on the kiosk. The GUI may show the cost associated with each job request and a total cost for all of the job requests. The GUI may allow a user to add additional jobs to update the total cost, modify parameters of each job to change an associated cost of a respective job request, input a desired arrangement of jobs added from different sources, and so forth.

In one embodiment, when some changes are made to a job request, the change may be made in software without resubmitting the document or rescanning the document. If a change requires a user to rescan or resubmit a document, the kiosk may present a notification via the GUI to the user to rescan the document.

At block 510, the method 500 receives a single payment for the plurality of job requests via the payment processing module. For example, the single payment may be submitted to begin execution of the multiple job requests that are processed in parallel. In one embodiment, the single payment may be received earlier, and the total costs of the job requests can be deducted from the authorized amount.

At block 512, the method 500 executes the plurality of job requests. In one embodiment, as the plurality of job requests are being executed, the user may submit additional job requests. In one embodiment, the block 510 may be performed after block 512. For example, the job requests may be executed before payment is received. Thus, as additional job requests are added, the total costs can be updated. The payment may then be received after all of the user's job requests are received (e.g., the user has no more job requests). If payment is received and the jobs are completed, the completed jobs may be accessed from a secured compartment of the kiosk.

In one embodiment, additional job requests can be added and processed while earlier submitted job requests are being processed. In other words, the user does not need to wait for each job request to be completed before adding and/or managing additional job requests. Thus, the present disclosure allows users to process and/or manage multiple job requests in parallel with a single payment, while previously submitted job requests are being processed or completed. At block 514, the method 500 ends.

Figure 6:
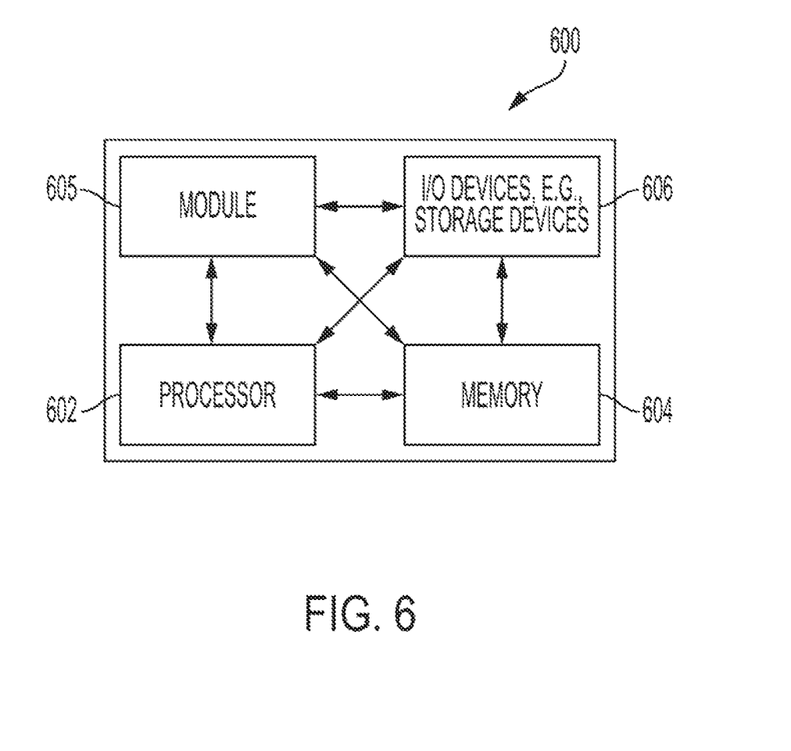
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for executing jobs in parallel on a kiosk, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for executing jobs in parallel on a kiosk (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for executing jobs in parallel on a kiosk (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A kiosk, comprising:
   a graphical user interface (GUI);
   a payment processing module to receive payment;
   a plurality of different communication interfaces to receive or send a job request from each one of the plurality of different communication interfaces;
   a processor; and
   a non-transitory computer-readable medium storing a plurality of instructions, which when executed by the processor, causes the processor to perform operations to manage a plurality of job requests in parallel with a single payment comprising:
   receiving the plurality of job requests from the plurality of different communication interfaces, wherein the plurality of job requests comprises different parameters for each one of the plurality of job requests, wherein the different parameters comprise a job function, a number of copies, a color, and a paper size;

presenting documents associated with each one of the plurality of job requests from the plurality of different communication interfaces on the GUI;

receiving via the GUI a desired arrangement of the documents for the plurality of job requests;

providing a total cost of the plurality of job requests on the GUI;

receiving a confirmation of the total cost via the GUI;

receiving the single payment for the plurality of job requests via the payment processing module; and executing the plurality of job requests in the desired arrangement.

2. The kiosk of claim 1, wherein the GUI is to display a status of each one of the plurality of job requests and a cost associated with each one of the plurality of job requests.

3. The kiosk of claim 1, wherein the processor is to perform operations further comprising:

receiving a change to one of the plurality of job requests; and updating the total cost of the plurality of job requests on the GUI.

4. The kiosk of claim 3, wherein the processor is to perform operations further comprising:

detecting that the change requires a rescan of a document; and notifying a user via the GUI to rescan the document.

5. The kiosk of claim 1, wherein the processor is to perform operations further comprising:

receiving an additional job request while the plurality of job requests is being executed.

6. The kiosk of claim 1, wherein the processor is to perform operations further comprising:

detecting an error in a job of the plurality of job requests;

determining a partial cost associated with the job; and deducting the partial cost from the total cost to update the total cost.

7. The kiosk of claim 6, wherein the processor is to perform operations further comprising:

providing on the GUI an option to re-execute the job that had the error.

8. The kiosk of claim 1, wherein the plurality of different communication interfaces comprises a universal serial bus (USB) interface connected to an external memory device, a network interface to connect to a cloud storage device, and an interface to access documents from an email or send scanned documents via an outgoing email.

9. A method to manage a plurality of job requests in parallel with a single payment, comprising:

receiving, by a processor of a kiosk, the plurality of job requests from a plurality of different communication interfaces, wherein the plurality of job requests comprises different parameters for each one of the plurality of job requests, wherein the different parameters comprise a job function, a number of copies, a color, and a paper size;

presenting, by the processor, documents associated with each one of the plurality of job requests from the plurality of different communication interfaces on a graphical user interface (GUI);

receiving, via the processor, a desired arrangement of the documents for the plurality of job requests entered via the GUI;

providing, by the processor, a total cost of the plurality of job requests on the GUI of the kiosk;

receiving, by the processor, a confirmation of the total cost via the GUI;

receiving, by the processor, the single payment for the plurality of job requests via a payment processing module of the kiosk; and executing, by the processor, the plurality of job requests in the desired arrangement.

10. The method of claim 9, wherein the GUI displays a status of each one of the plurality of job requests and a cost associated with each one of the plurality of job requests.

11. The method of claim 9, further comprising:

receiving, by the processor, a change to one of the plurality of job requests; and updating, by the processor, the total cost of the plurality of job requests on the GUI.

12. The method of claim 11, further comprising:

detecting, by the processor, that the change requires a rescan of a document; and notifying, by the processor via the GUI, a user to rescan the document.

13. The method of claim 9, further comprising:

receiving, by the processor, an additional job request while the plurality of job requests is being executed.

14. The method of claim 9, further comprising:

detecting, by the processor, an error in a job of the plurality of job requests;

determining, by the processor, a partial cost associated with the job; and deducting, by the processor, the partial cost from the total cost to update the total cost.

15. The method of claim 14, further comprising:

providing, by the processor on the GUI, an option to re-execute the job that had the error.

16. The method of claim 9, wherein the receiving the plurality of job requests further comprises receiving documents from a plurality of different sources, wherein the plurality of different sources comprises an external memory device connected to the kiosk, a cloud storage device, and an email.

17. A kiosk, comprising:

a shopping cart graphical user interface (GUI);

a payment processing module to receive a payment;

a plurality of different communication interfaces to receive or send a job request from each one of the plurality of different communication interfaces;

a processor; and a non-transitory computer-readable medium storing a plurality of instructions, which when executed by the processor, causes the processor to perform operations to manage a plurality of job requests in parallel with a single payment comprising:

receiving the plurality of job requests from the plurality of different communication interfaces, wherein the plurality of job requests comprises a scan of a document or a document saved on an external source, wherein the plurality of job requests comprises different parameters for each one of the plurality of job requests, wherein the different parameters comprise a job function, a number of copies, a color, and a paper size;

presenting documents associated with each one of the plurality of job requests from the plurality of different communication interfaces on the shopping cart GUI;

receiving via the shopping cart GUI a desired arrangement of the documents for the plurality of job requests;

providing a total cost of the plurality of job requests on the shopping cart GUI, wherein the shopping cart GUI presents a cost associated with each one of the plurality of job requests and selected parameters that contribute to the cost associated with each one of the plurality of job requests;

receiving a confirmation of the total cost via the shopping cart GUI;

starting to execute the plurality of job requests in the desired arrangement;

receiving additional job requests;

updating the total cost of the plurality of job requests to include a cost of the additional job requests;

receiving via the payment processing module the single payment for the plurality of job requests as updated to include the cost of the additional job requests; and completing execution of the plurality of job requests and the additional job requests.

* * * * *